United States Patent
Dulaney et al.

(10) Patent No.: US 6,238,187 B1
(45) Date of Patent: May 29, 2001

(54) METHOD USING LASER SHOCK PEENING TO PROCESS AIRFOIL WELD REPAIRS PERTAINING TO BLADE CUT AND WELD TECHNIQUES

(75) Inventors: Jeff L. Dulaney, Dublin; Allan H. Clauer, Worthington, both of OH (US); Joseph F. Clarady, Wethersfield, CT (US); Robert Baumgarten, Palm Beach Gardens, FL (US); Jerry G. Weinstein, Middletown, CT (US); Benjamin R. Hack, Hobe Sound, FL (US)

(73) Assignees: LSP Technologies, Inc., Dublin, OH (US); United Technologies Corporation, Hartford, CT (US)

( * ) Notice: Subject to any disclaimer, the term of this patent is extended or adjusted under 35 U.S.C. 154(b) by 0 days.

(21) Appl. No.: 09/418,115

(22) Filed: Oct. 14, 1999

(51) Int. Cl.[7] ....................................... B63H 1/26
(52) U.S. Cl. .................. 416/241 R; 416/223 R
(58) Field of Search .................. 416/241 R, 223 A, 416/1, 223 R, DIG. 3; 415/9

(56) References Cited

U.S. PATENT DOCUMENTS 2,355,413 * 8/1944 Bloomberg ..................... 416/223 A
4,961,686 * 10/1990 Blair et al. ..................... 416/223 A

* cited by examiner

Primary Examiner—Edward K. Look
Assistant Examiner—Hermes Rodriguez
(74) Attorney, Agent, or Firm—Randall J. Knuth

(57) ABSTRACT

A method is disclosed for repairing damage to an airfoil. The method provides for the removal of a section of the airfoil that substantially encompasses the damaged area, which consequently leaves a void and a cut-away surface in the airfoil. A replacement piece larger than the residual void is provided for use in replacing the section removed from the airfoil. A joining operation welds or otherwise joins the replacement piece to the airfoil at the cut-away surface to form a joined airfoil. The joined airfoil has a seam between the airfoil and the replacement piece. At least a portion of the seam is processed by laser shock peening to induce compressive residual stresses therein.

39 Claims, 8 Drawing Sheets

METHOD USING LASER SHOCK PEENING TO PROCESS AIRFOIL WELD REPAIRS PERTAINING TO BLADE CUT AND WELD TECHNIQUES

BACKGROUND OF THE INVENTION

1. Field of the Invention

The present invention relates generally to a processing method for repairing a solid body such as an airfoil from a gas turbine engine having a damaged section, and, more particularly, to a method of repairing a portion of the airfoil encompassing the damaged section and utilizing laser shock peening to process a weld joint formed between the airfoil and a replacement piece.

2. Description of the Related Art

Gas turbine engine components such as air foils, rotors and disks are regularly exposed to very high temperatures, vibrations, foreign object damage (FOD) and significant pressure fields as part of the normal operating mode of an engine. These operating conditions typically act over time to deteriorate and weaken the components to make them more susceptible to the formation of damage areas such as pits, cavities, depressions, and cracks. If the damage is not promptly addressed and suitably repaired, the components may become irreparably damaged due to the rapid propagation of existing damage and the reappearance of damage within malrepaired areas. Such irreparable damage becomes more likely to occur within the typical operating environment due to the presence of high cycle fatigue at high temperatures, which serves to accelerate whatever damage already exists within the engine. For the metallic components contained within the engine, the extreme thermal cycling that characterizes normal engine operation represents one of the more deleterious conditions that further aggravates the already severe circumstances under which the components must operate. It is therefore imperative that repair strategies be developed to facilitate a renewal of the engine component that restores it to a physical condition resembling as near as possible its original state. Any repair procedure must not diminish or otherwise adversely effect the functionality and range of operation of the engine component.

Various conventional repair techniques have been developed that aim to fix the damage which appears, for example, within the vane assembly of a gas turbine engine. These approaches have typically focused upon two common types of damage, namely cracks and other such fissures in the edges and sides of the airfoil and voids or other such cavity-like depressions in the major surfaces of the airfoil. Repairing damage to the trailing edge of an airfoil, for example, involves applying a series of weld bead layers of a suitable fill material into the missing edge space to progressively build up the edge until the space is eventually closed out. The fill material is typically built up past the dimensions of the original surface to ensure a proper amount of material accumulation, requiring a deburring process to grind away the excess fill material until the edge conforms substantially to the original surface contour. This procedure clearly features a customized repair operation that tailors the deposition of fill material and the grinding of the excess material to the particular damage under consideration.

Interior surface damage typically takes the form of a cavity or void that arises, for example, when a foreign object such as debris impacts the airfoil surface and causes a portion to break away from or substantially deform the airfoil. In a manner similar to edge build-up, the surface void is filled with a suitable repair material that preferably extends past the surface plane. The excess material is removed by a suitable grinding action until the exposed surface of the fill body is made flush with the adjoining airfoil surface.

These conventional approaches, however, have numerous drawbacks in terms of their applicability to integrally bladed rotors and airfoils in general; effectiveness in repairing wide-scale major damage; ability to treat and counteract the full scope of damage; and suitability within manufacturing and servicing environments that require reproducible standardized repair procedures.

Repair techniques that rely upon resupplying the damage-affected area with fill material to replace the missing airfoil section adopt a customized type of repair strategy that needs to be individually adapted during each repair job to the current damage situation being examined. This customization means that the repair procedure for each damage site will be accompanied by a damage-specific material application sequence to build up the void, followed by a corresponding grinding activity to remove the excess fill material. Performing repairs in this manner prevents the development of a reproducible and repeatable repair procedure characterized by a uniform and universally applicable set of standardized repair steps that do not depend upon the particular form of damage—to the degree evidenced by conventional approaches—in implementing the actual sequence of repair operations.

Another limitation of conventional repair approaches is that only the exposed damage accessible to these repair techniques can be treated. Consequently, some latent deformities may remain within the engine component.

For example, when foreign object damage occurs to the airfoil, the resulting void is clearly apparent and therefore serves as the focus of the repair procedure. However, the impact may also leave residual cracks and other weaknesses in the region of the airfoil surrounding the void that will not be treated by a conventional approach simply involving the application of a fill material and the removal of excess material after build-up. If these residual cracks or other weaknesses are not properly treated, the residual cracks and other weaknesses may form the genesis of further engine component failure. When the engine component is placed back into service without treating potential failure zones such as cracks and areas of weakness (e.g. stress riser), these weaknesses may eventually manifest themselves in a more severe manner as the airfoil is returned to normal operation.

Current repair techniques are generally suitable for handling occurrences of minor damage such as small cracks and pits typically resulting from fatigue and gradual deterioration caused by small FOD. However, these approaches become less desirable and more unsuitable as the damage becomes more aggressive and occupies a greater spatial area. In these situations, the conventional strategy involves replacing the entire engine component (e.g. the entire fan blade comprising an airfoil, base, and root) rather than patching the damaged area.

In an integrated assembly such as an integrally bladed rotor (IBR), there is no opportunity for removal of an individually affected blade because the arrangement of blades is permanently integrated into the rotor. Consequently, conventional approaches are completely unsuited for repairing IBRs, to the extent that such approaches recommend replacement of an individual blade as a feature of the repair solution. Additionally, as noted above, it is customary in conventional approaches to remove the affected blade and deliver it to a repair site even in the event of damage that does not necessitate the replacement of an entire engine component. This aspect of implementation suggests for conventional repair procedures a degree of incompatibility with respect to handling IBRs or any other integrated component configuration that does not permit or make feasible the removal and reattachment of some portion, such as an airfoil.

Two patents which are directed to gas turbine engine vane repair are U.S. Pat. Nos. 5,584,662 and 5,675,892, entitled "LASER SHOCK PEENING FOR GAS TURBINE ENGINE VANE REPAIR". Both utilize the technique of braze filling a void formed in a damaged vane followed by laser shock peening the surface of the brazed filled void.

An additional method of gas turbine engine repair is disclosed in U.S. Pat. No. 5,735,044 entitled "LASER SHOCK PEENING FOR GAS TURBINE ENGINE WELD REPAIR". This patent is directed to repairing an engine component by first laser shock peening the surface of an engine component around a damaged portion to impart deep compressive residual stresses extending into a substrate bond surface of the engine component. Following laser shock peening a metallic filler is bonded onto the substrate.

SUMMARY OF THE INVENTION

According to the present invention there is provided a method of repairing an airfoil having an area targeted for repair including, for example, various types of damage sites. The method is particularly useful in applications involving gas turbine engines that include either individual airfoils or an integrally bladed rotor (IBR) comprising a plurality of blade members integrally joined to a rotor member.

The method includes the step of removing a section of the airfoil that substantially encompasses the targeted repair area, i.e., the damage site. The removal of the airfoil section leaves a residual void and a cut-away surface in the airfoil. A replacement piece is provided for use in replacing the section removed from the airfoil.

The replacement piece, in one embodiment, substantially spatially matches the residual void left in the airfoil. In an alternate embodiment, the replacement piece is larger than the residual void and further includes a shaping step to remove the excess material to achieve a desired predetermined airfoil geometry. A joining operation is used to attach the replacement piece to the airfoil at the cut-away surface to form a joined airfoil. A seam is formed between the replacement piece and the airfoil. The joined airfoil is further processed by laser shock peening along at least a portion of the seam and any heat affected zone to produce compressive residual stresses in the seam region.

The laser shock peening process has the effect of inducing compressive residual stresses within these identified areas of the joined airfoil to effectively provide a form of cold work hardening that strengthens the seam and surrounding region of the airfoil and replacement piece. Typical geometries for the replacement piece include a rectilinear shape, a curvilinear shape, a hemispherical shape, a circular shape, a wedge-type shape, a rectangular shape, and a cubical shape.

The invention, in one form thereof, comprises a method of repairing an airfoil having a damaged area. According to the repair method, a section of the airfoil containing the damaged area is removed, leaving a void and a cut-away surface in the airfoil. A replacement piece is provided for use in replacing the section removed from the airfoil. The replacement piece, in one further embodiment, substantially spatially matches the void in the airfoil. In an alternate further embodiment, the replacement piece is larger than the void, which has the advantage of eliminating the difficult alignment step prior to the joining step. The replacement piece is joined to the airfoil at the cut-away surface to form a joined airfoil.

The joined airfoil has a seam between the airfoil and the replacement piece. A portion of the seam is laser shock peened to impart compressive residual stresses therein.

The joining step may further include the step of welding the replacement piece to the airfoil at the cut-away surface.

The damaged area includes damage belonging to the group comprising a cavity, a depression, a void, a crack, a fissure, an edge deformation, a thermal-induced deformation, a pressure-induced deformation, a vibration-induced deformation, and an impact-induced deformation arising from a foreign object.

The invention, in another form thereof, includes a method of processing a workpiece having an area targeted for repair. According to the processing method, a section of the workpiece substantially containing the targeted repair area is removed, leaving a residual void and a cut-away surface in the workpiece. A replacement piece is provided for use in replacing the section removed from the workpiece. The replacement piece, is larger than the residual void in the workpiece. The replacement piece is welded to the workpiece at the cut-away surface to form a joined assembly. The joined assembly has a seam formed between the workpiece and the replacement piece. The weld extends along the replacement piece past the cut-away surface. The joined assembly is shaped to return the airfoil to within predetermined tolerances. At least a portion of the seam is laser shock processed to develop compressive residual stresses therein.

One advantage of the present invention is that the repair method may be implemented as a standardized procedure that makes possible a repeatable, reproducible, and universally applicable repair operation particularly useful in IBR applications but still generally available to airfoils, aerodynamic components, and other such components.

Another advantage of the present invention is that the particular repair operation involving the removal of a component portion that encompasses the damaged area has the effect of eliminating from the component not only the exposed visible damage but also any latent, unknown, or conventionally inaccessible damage areas since the removed portion will typically include the region surrounding the visible damage area where such non-apparent damage usually is present.

Another advantage of the present invention is that the integrity of the welded joint that couples the replacement piece to the workpiece, such as an airfoil, is significantly improved by the laser shock peening process, which facilitates the development of compressive residual stresses in the welding region, thereby counteracting the presence of any tensile fields typically accompanying a welding operation.

A further advantage of the present invention is that it is now possible to repair damage to the airfoils of gas turbine engine blades and IBRs without having to resort to a wholesale replacement of the entire fan blade or IBR.

A yet further advantage of the present invention is that the repair procedure functions relatively independently of the particular type and form of damage present within the workpiece since the removal operation cuts or mills away an entire section containing the damage and therefore does not need to be specifically adapted or tailored to the unique geometry of the damage. The removal step identifies the region of the part where the damaged area is present and removes a portion of the component containing the damage.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

By way of background, the repair method according to the present invention utilizes laser shock peening to process a workpiece such as a gas turbine engine component under repair.

The gas turbine engine component could be an airfoil of a blade or an IBR. Laser shock peening, as understood in the art and as used herein, refers to the utilization of electromagnetic energy generated by a laser beam source to produce a strong localized compressive force on a portion of the target surface that initiates the development of shock waves transmitted into the interior of the targeted workpiece. These shock waves effectively provide a form of cold work hardening that creates compressive residual stresses extending into the workpiece, which fosters an increase in fatigue properties of the part and alleviates and/or counteracts the presence of other weaknesses such as crack fronts and tensile fields.

Laser shock peening often employs an opaque overlay such as an oil-based or acrylic-based black paint applied to the surface of a workpiece, e.g. a component of a gas turbine engine. A transparent overlay such as a curtain of water is applied to the coated portion of the workpiece. A high-energy laser beam is repetitively fired through the curtain of flowing water and onto the coated surface of the workpiece. The laser beam energy is absorbed by the black paint to create peak power densities in excess of a gigawatt/cml, causing a rapid vaporization of the opaque overlay that generates a rapidly expanding plasma. The rapidly expanding plasma is trapped by the curtain of water, resulting in the development of a high-amplitude shock wave that travels into and cold work the workpiece. The amplitude and quantity of the shock waves determine the depth and intensity of the resulting residual compressive stresses formed in the material. The opaque overlay when used, protects the target surface and also enhances the generation of the plasma. Vaporized opaque overlay is removed by the curtain of flowing water. A workpiece is typically processed by utilizing a series of overlapping laser beam spots that cover the fatigue critical zone of the workpiece.

Further descriptions of laser shock peening technology may be found in U.S. Pat. Nos. 5,131,957 and 5,741,559, both hereby incorporated herein by reference thereto. The '957 patent shows a type of laser and laser circuit adaptable for use with the present invention. Another type of laser adaptable for use with the invention is that of an ND: Glass Laser manufactured by LSP Technologies of Dublin, Ohio. An additional useful reference is "Shock Waves and High Strain Rate Phenomena in Metal" by A. H. Clauer, J. H. Holbrook and B. P. Fairand, ed. by M. S. Meyers and L. E. Murr, Plenum Press, New York (1981), pp. 675–702, hereby incorporated herein by reference thereto.

Figure 1:
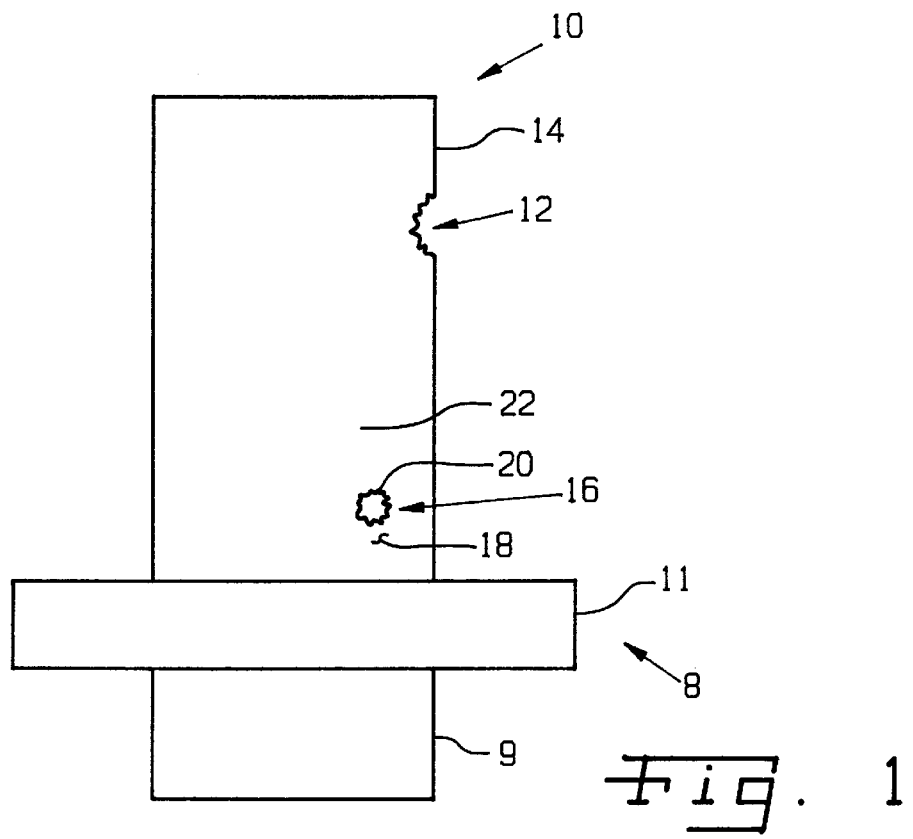
FIG. 1 is a front elevated sectional plan view of a fully intact part of a gas turbine engine component to illustrate the presence of typical forms of damage.
Figure 2:
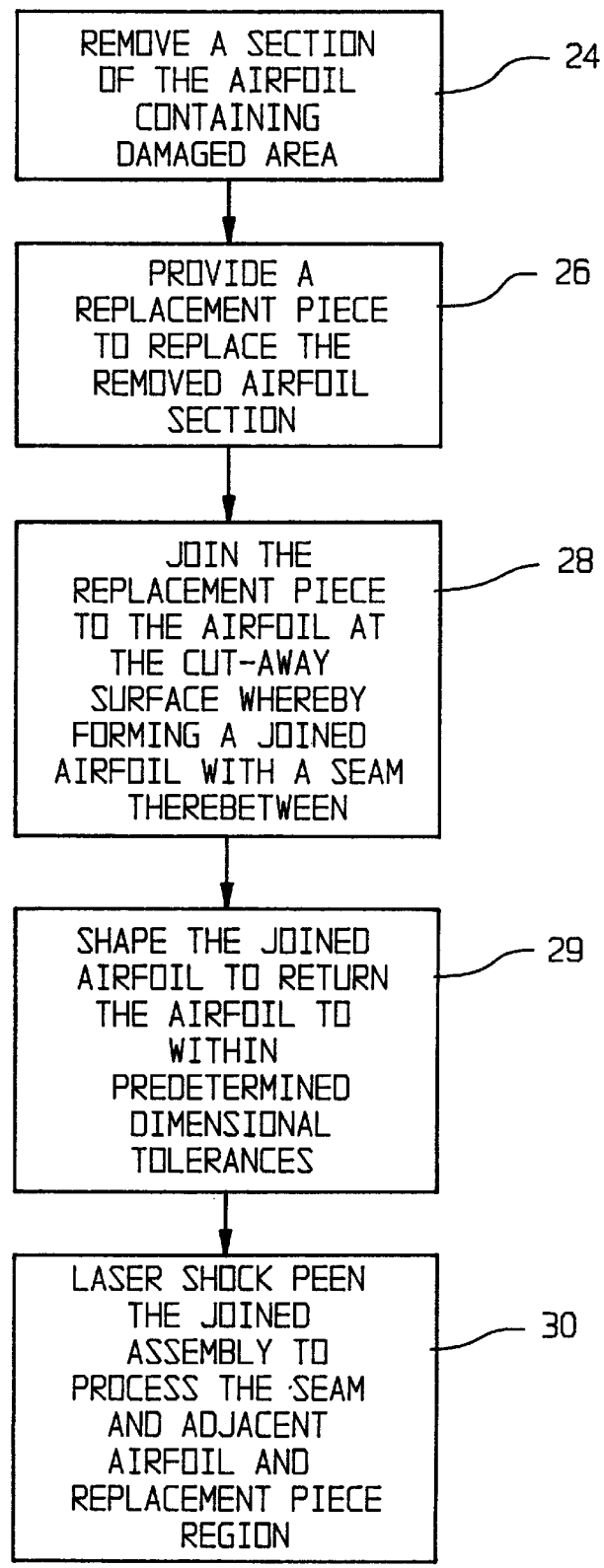
FIG. 2 is a flowchart providing an overview of the repair method according to one embodiment of the present invention for illustratively repairing the damage shown in the gas turbine engine component of FIG. 1.

Referring now to the drawings and particularly to FIGS. 1 and 2, there is first shown in FIG. 1 a front elevated sectional plan view of a fully-intact gas turbine engine component in the form of blade 8. Blade 8 comprises root 9, airfoil 10 and base 11. Airfoil 10 is used to illustrate the presence of typical forms of damage, namely leading edge damage site 12 representing a recess or broken-away area formed at edge 14 of airfoil 10 and surface damage site 16 representing a crack 18 and cavity-like depression 20 formed at a surface area 22 of airfoil 10. For purposes of description herein, airfoil 10 corresponds illustratively to an airfoil of an aerodynamic machine such as a gas turbine engine blade, (fan, compressor or turbine), an integrated blade and rotor assembly or an impeller airfoil, although the present invention should not be considered as being so limited since the repair method disclosed herein may be extended for general use with any type and form of workpiece.

As will become more apparent herein, the repair method of the present invention, which is generally described by the flowchart of FIG. 2, performs a repair process on airfoil 10. The repair on airfoil 10 comprises removing selected portions or sections of airfoil 10 substantially containing damage sites 12 and 16 (step 24) and replacing them with replacement pieces (step 26). Replacement pieces are integrally joined to airfoil 10 using a joining operation to form joined airfoil (step 28). A seam is formed between the airfoil and the replacement piece (step 28). Following the joining step, the joined airfoil is shaped to return the joined airfoil to within predetermined dimensional tolerances (step 29). A laser shock peening treatment (step 30) induces the formation of compressive residual stresses in the seam formed at the weld joint between the airfoil and the replacement piece. Damage sites 12 and 16 are shown for illustrative purposes only and should not be considered in limitation of the present invention as it should be apparent to those skilled in the art that the repair method disclosed herein can be utilized in conjunction with any type and form of damage.

As used herein, the term "damage" as it applies to a workpiece, for example a gas turbine engine component such as an airfoil of a blade, an IBR, an impeller, or any other workpiece under examination should be understood as encompassing any feature, characteristic, attribute, aspect, or other such quality that is present or existing within the workpiece and for which removal or repair thereof is desirable. This damage may take the form of physical or structural deformations, malformations, imperfections, anomalies or irregularities including, but not limited to, cracks, dents, fissures, fractures, pits, depressions, voids, cavities, and substandard surfaces or edges. Additionally, the damage may take the form of material-based flaws, weaknesses, or non-uniformities including, but not limited to, defects in the crystal formation of the airfoil, inherent weaknesses due to inferior or substandard manufacturing techniques, and structural flaws attributable to an inferior material construction. Moreover, the damage may be external or internal. The damage may arise from any source including, but not limited to, an external agent such as a foreign body that adversely impacts the solid body or it may arise from an inherent, intrinsic, or latent quality of the airfoil such as a design, fabrication, or assembly flaw. The cause of such damage may include, but is not limited to, a thermal-induced deformation, a pressure-induced deformation, vibration-induced deformation, and an impact-induced deformation. Additionally, the damage may arise from an operating condition such as excessive temperature or pressure that precipitates the formation of the above-identified structural defects.

In the preferred embodiment, a section is removed from the airfoil, having the airfoil fixtured in rigid tooling with the damaged area of the airfoil milled or cut away starting from either the airfoil's tip, or leading edge, or trailing edge. A cut-away surface is formed on the residual portion of the airfoil by the removal of the selected section of airfoil 10.

It is preferable to mill away the damaged area rather than utilizing a single cut to remove the damaged area. Using a single cut may create vibration which could alter the remaining airfoil, such as altering the airfoils dimensional tolerances. However, EDM cutting may be used wherever practical.

In one preferred embodiment, the damaged area removed from the airfoil forms a triangular blade repair area that extends between the leading edge and the tip along a predetermined cut line. The predetermined cut line is an area or location of low stress on the airfoil extending between the leading edge and the tip of the airfoil. The precise cut-plane may vary slightly depending on the stress field in the particular airfoil that is being repaired.

During the step of joining the replacement piece to the airfoil, (step 28) a replacement piece is positioned on the airfoil along the cut-away surface and is positioned on the airfoil using a located fixture. Weldment run-out tabs are spot welded to the replacement piece, and the replacement piece is welded to the airfoil to maintain position prior to electron beam (EB) welding. A "line-of-sight" electron beam (EB) weld bead is deposited on one side of the airfoil (either the pressure or suction side). A touch-up tig weld may be required on the opposite side of the weld to eliminate any EB weld beam blow-through and/or weldment underfill.

The joined airfoil is fixtured in rigid machine tooling and contoured to a slightly oversized finish airfoil contour envelope (step 29). A final step of hand contour blending grinds the joined airfoil to a finished dimension (step 29). The resulting joined airfoil has a predetermined dimensional tolerance. In one embodiment of the present invention, the resulting airfoil predetermined dimensional tolerance is substantially that of a non-damaged airfoil.

As disclosed herein, a "section" or a "portion" of a gas turbine engine component or other workpiece, as used within the context of the removal operation of the repair method according to the present invention, should be understood as representing a physical entity of the relevant arrangement (e.g., airfoil or workpiece) that constitutes a partial, fractional, sectional, segmental, or fragmentary piece of the machine body. Unlike conventional approaches, the repair method of the present invention, in one form, proposes to remove only a portion of the airfoil encompassing or containing the damaged area instead of the entire affected part or component such as the entire blade or IBR.

Figure 3:
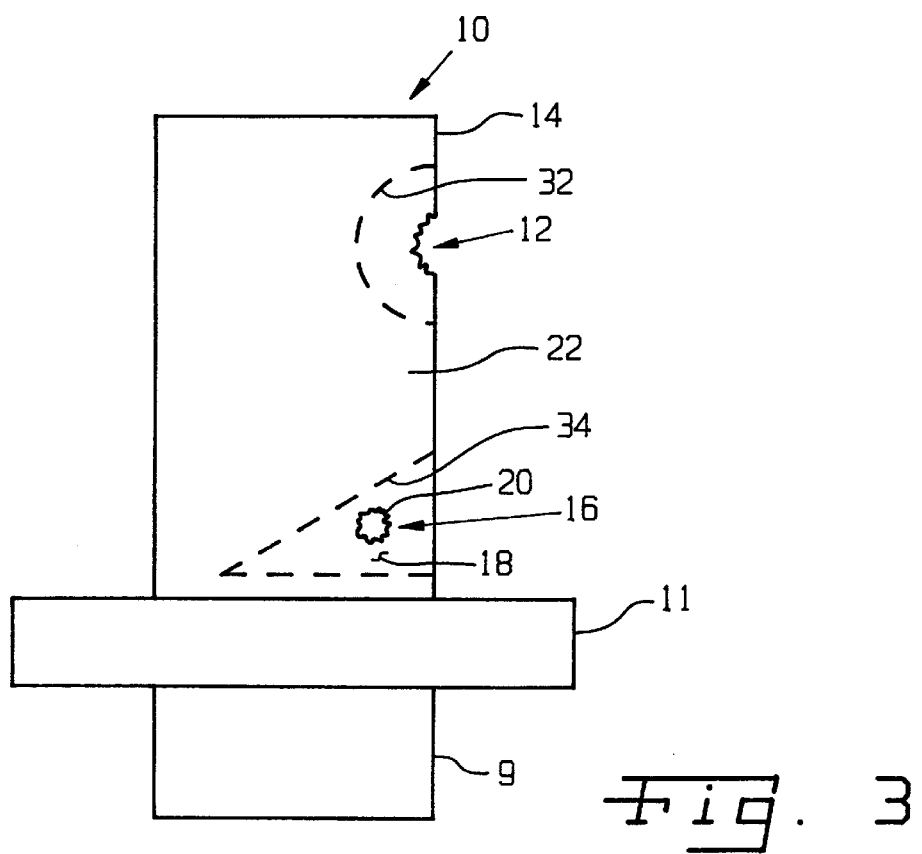
FIG. 3 is a front sectional plan view similar to FIG. 1 including illustrative cut-away lines shown in phantom outline view to indicate the form and manner of removing the damaged area from the gas turbine engine component in accordance with one aspect of the repair method of the present invention.

Referring now to FIGS. 3–7 in conjunction with the damage repair procedure outlined in FIG. 2, there is shown in a series of successive views one illustrative implementation of the repair method according to one embodiment of the present invention for repairing the damage to airfoil 10 illustrated in FIG. 1. Referring specifically to FIG. 3, removal step 24 involves selecting a spatial geometry subsisting within airfoil 10 that substantially encompasses or contains the illustrated edge damage site 12 and the illustrated surface damage site 16. As will be discussed further in connection with FIG. 5, this spatial geometry is selected to conform to at least one of the geometrical shapes included within a universal, standardized inventory of replacement pieces that are previously manufactured, preformed, and/or prefabricated. For this purpose, the removal operation is preferably coordinated with replacement step 26 to ensure that a suitable replacement piece already exists or can be readily made that accommodates the replacement of the portion removed from airfoil 10 and using the removal step.

Referring still to FIG. 3, the illustrated phantom cut-line 32 represents in trace outline circumscribing the boundary or contour of the removal section of airfoil 10 containing leading edge damage site 12. In particular, trace cut-line 32 illustratively represents a curvilinear-shaped geometry taking the form of a circular portion, for example. Similarly, phantom cut-line 34 represents in trace outline circumscribing the boundary or contour of the removal portion of airfoil 10 containing surface damage site 16. In particular, trace cut-line 34 illustratively represents a rectilinear-shaped geometry taking the form of a wedge-shaped portion, for example. It is substantially along these lines that the removal or cutting operation takes place to remove the indicated portions of airfoil 10. These phantom cut-lines 32 and 34 may therefore be considered as circumscribing the portions of airfoil 10 subject to the removal operation.

The preferred method for removing the damaged area and surrounding airfoil section, such as the section of the airfoil 10 surrounded by phantom-cut lines 32 and 34 is by milling away the section of airfoil 10. Phantom-cut lines 32 and 34, in a preferred embodiment, are predetermined as a low stress location along airfoil 10. The exact location and cut-plane of phantom-cut lines 32 and 34 may vary, depending on the stress field of the particular airfoil workpiece stage which is to be repaired.

Figure 4:
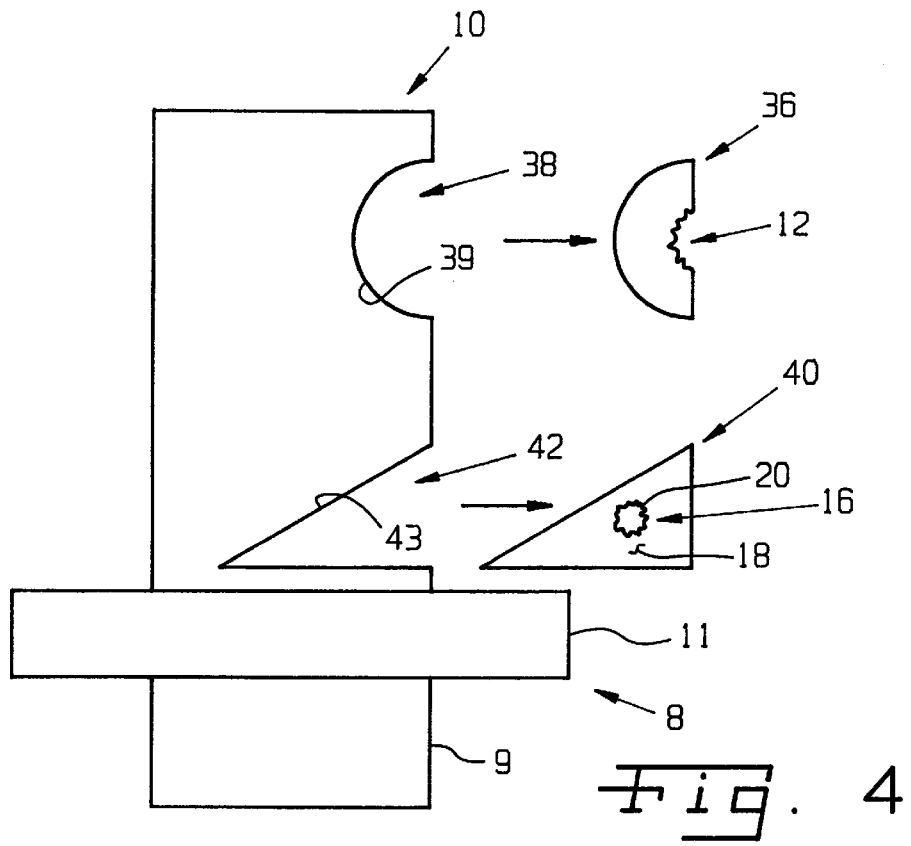
FIG. 4 is a sectional plan view of the engine component shown in FIG. 1 illustrating in exploded view the removal of the engine component portions depicted in phantom outline view in FIG. 3, according to another aspect of the repair method of the present invention.

Referring now to FIG. 4, the completion of the removal step results in the removal of a damaged section 36 from airfoil 10, leaving a void 38 and cut-away surface 39 remaining in airfoil 10 where damaged section 36 once was present. Additionally, the completion of the removal step also results in the removal of a damaged airfoil section 40 from airfoil 10, which likewise leaves a void 42 and cut-away surface 43 remaining in airfoil 10 where damaged section 40 once was present.

One aspect of the present invention apparent from FIG. 4 is that the removal operation acts to remove not only the illustrated damage sites 12 and 16 but also certain regions of airfoil 10 surrounding the damage sites. This feature is advantageous in light of the fact that the full extent of damage may not be limited to the exposed visible damage such as missing leading edge damage site 12, crack 18 or, depression 20 but instead may include latent or unexposed damage present within the adjacent surrounding areas of the visible damage. Accordingly, by removing a section of airfoil 10 in the manner illustrated in FIG. 4 so as to encompass at least part of the region surrounding the primary damage sites, it is possible for other related damage (e.g., defects, deformations, and weaknesses) not otherwise accessible by conventional repair techniques to be removed along with damage sites 12 and 16.

Another aspect of the present invention apparent from FIG. 4 is that the repair method, and in particular the damaged section removal step, operate virtually independent of the specific nature, character, and type of damage currently being considered for repair. The reason for this is that the removal step does not focus or depend upon the specific aspects or qualities of the damage site, but simply concerns itself with the identification and selection of a suitable removal section of airfoil 10 containing the damage sites.

A yet further aspect of the present invention apparent from FIG. 4 is that the removal step particularly accommodates itself to the performance of repair operations on any integrated assembly such as an integrated blade and rotor component. Unlike conventional approaches that permit and sometimes mandate the replacement of an entire blade or IBR to remedy damage situations deemed unsuitable for repair by conventional techniques (e.g., large-scale or multiple damage sites), the conventional approach cannot be applied to the repair operations for an IBR component since by definition these components are specifically made to exist solely in integral form. Therefore, IBRs are incompatible with any type of servicing or maintenance procedure that requires separating the blade from the rotor.

In particular, it is imperative with an IBR that repairs be made to the integral assembly since otherwise the entire IBR would have to be scrapped and replaced. An individual blade of an IBR cannot be disassembled and repaired by piecewise replacement of the individual parts since the blade arrangement and rotor are fashioned into a single integral unit incapable of such disassembly. From a cost standpoint, repairs to a regular blade may optionally include simple replacement of the damaged blade. However, this piecewise replacement option is not available to an IBR due to its integral feature.

The present invention, by comparison, is particularly suited to airfoils of fan blades and IBRs since the integral configuration of the component remains intact while only a targeted section containing the damaged area is removed for replacement in comparison to replacement of an entire discrete component such as an entire blade or IBR.

Moreover, the repair method of the present invention is well suited to handling large-scale damage formations or multiple neighboring damage sites arising from a common adverse influence (e.g., a concentrated debris stream) since the removal step can be sufficiently selectively adapted to ensure that the full scope and extent of the damage-affected area is properly circumscribed by the cutting or milling operation.

Figure 5:
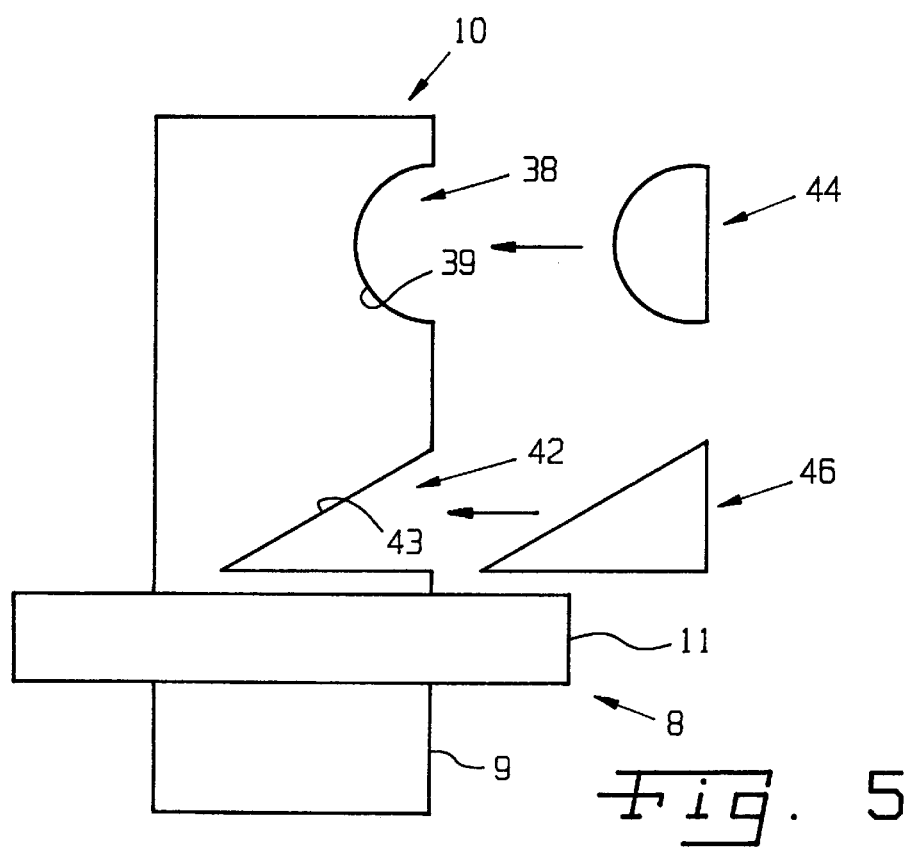
FIG. 5 is a sectional plan view of the engine component shown in FIG. 4 illustrating in exploded view the juxtaposition of the replacement pieces relative to their intended destinations within the engine component corresponding to the residual voids made by the removal operation illustrated in FIG. 4, according to another aspect of the repair method of the present invention.

Referring now to FIG. 5, there is shown airfoil 10 in its post-cut form following completion of the removal operation illustrated by FIG. 4, showing in particular the juxtaposition of replacement pieces 44 and 46 relative to their intended destinations within airfoil 10, namely voids 38 and 42, respectively, according to another aspect of the present invention directed to replacement step 26 of FIG. 2. The illustrated replacement pieces 44 and 46 are provided for use in replacing the respective damaged airfoil portions 36 and 40 removed from airfoil 10.

Replacement pieces 44 and 46 are preferably provided in a geometrical form that is larger than their respective voids 38 and 42 such that airfoil 10 replacement pieces 44 and 46 are thicker and wider than the respective void. Each replacement piece 44 and 46 will preferably be constructed of the same material as the parent airfoil 10 and will generally be made according to the same or substantially identical fabrication and manufacturing techniques associated with formation of the parent airfoil. Generally, in addition to providing replacement pieces 44 and 46 in their matching spatial conditions relative to their respective residual voids 38 and 42, and cut-away surfaces 39 and 43 respectively, an attempt should be made to ensure that replacement pieces 44 and 46 conform in all other essential respects to machine part 10, which includes but is not limited to a consideration of factors such as material properties, crystal orientation, structural characteristics, and pre-assembly conditioning, treatment, or processing activity.

The illustrated replacement pieces 44 and 46 may be provided in accordance with various alternative approaches. One option involves making the replacement piece concurrently with or after the removal step either by using the circumscribing traces 32 and 34 of damaged portions 36 and 40, respectively, or by using the as-removed damaged portions 36 and 40 as the basis for creating a mold, for example, that facilitates fabrication and production of the desired replacement pieces. Alternatively, another gas turbine engine component such as an airfoil or IBR can be provided to serve as the source of replacement pieces, effectively using it in a cannibalizing manner.

As a further alternative, and in accordance with a preferred aspect of the present invention, the repair method disclosed herein will provide a plurality of discrete, pre-formed replacement pieces each having a respective characteristic geometry defining a corresponding spatial area subsisting within airfoil 10. Pre-forming such replacement pieces will preferably take into account, in advance, the expected shape for the sections that will need to be cut or milled away from airfoil 10 in order to remove the anticipated forms of damage such as those typically encountered in the operations of airfoil 10. The collection of pre-formed replacement pieces constitutes a standardized repair assembly having universal applicability to the repair operations for all relevant gas turbine engine components which includes airfoils of blades and IBRs. For this purpose, the removal step will need to coordinate its activity with the standardized collection of replacement pieces, making particular reference to the specific geometries thereof so as to properly select the shape of the section designated for removal. The standardization feature of the repair method disclosed herein enables the development of an easily repeatable and reproducible repair operation, at least with respect to the removal step and replacement step. The characteristic geometries may include, but are not limited to, a hemispherical shape, triangular shape, a wedge-type shape, a rectangular shape, a cubical shape, a curvilinear shape, and a rectilinear shape. The shapes are typically chosen with a view toward creating a geometry that favors structural integrity and avoids contours such as abrupt or irregular lines that may not remain stable in terms of inhibiting the formation or propagation of defects. Additionally, the types of shapes may take into account the need to make a replacement piece that can be readily and stably welded (or otherwise joined in some applicable manner) to airfoil 10 (i.e., shapes that favor a smooth weld line), as discussed in connection with FIG. 6. The strategy adopted for selecting the shape of the replacement pieces will likewise influence the considerations involved in defining the form of the removed sections, and hence the character of the removal operation.

Figure 6:
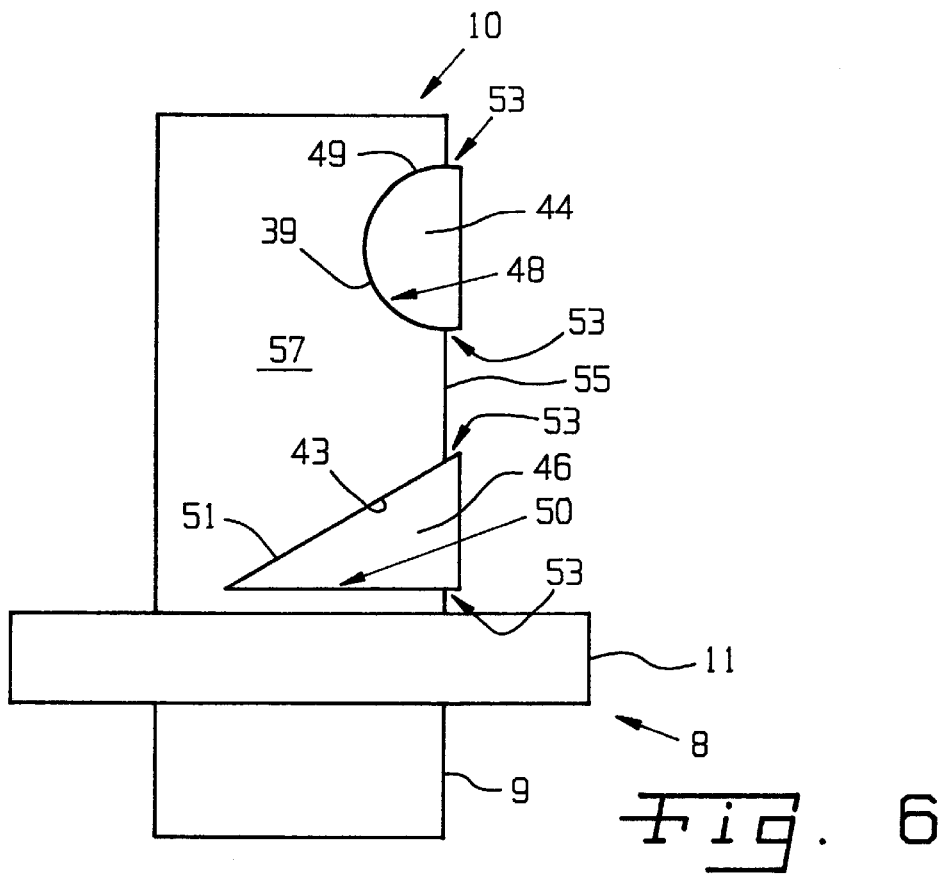
FIG. 6 is a sectional plan view of the engine component shown in FIG. 5 after the replacement pieces depicted therein have been joined to the engine component, according to another aspect of the repair method of the present invention.

Referring now to FIG. 6, there is shown in sectional plan view the particular form of airfoil 10 that results after replacement pieces 44 and 46 depicted in FIG. 5 have been joined to the airfoil 10 in accordance with joining step 28 of FIG. 2. In particular, replacement piece 44 is suitably positioned within its corresponding void 38 (FIG. 5) and then joined to airfoil 10 at cut-away surface 39. This joining activity is illustratively represented by welding joint 48 forming seam 49 between replacement piece 44 and airfoil 10. Similarly, replacement piece 46 is suitably positioned within its corresponding void 42 and then joined to airfoil 10 at cut-away surface 43. This joining activity is illustratively represented by welding joint 50 forming seam 51 between replacement piece 46 and airfoil 10. What results from these joining operations is the formation of a joined assembly (i.e. a joined airfoil) illustrated by the particular form for airfoil 10 shown in FIG. 6. The joining process typically involves a welding operation of conventional form.

The preferred joining method comprises spot welding weldment run-out tabs to the replacement piece 44, 46. The replacement piece 44, 46 is spot welded to airfoil 10 to maintain position of replacement piece 44, 46 relative to airfoil 10. A "line-of-sight" electron beam (EB) weld bead is deposited on one side of airfoil 10. A touch-up Tig weld may be necessary on the backside of the weld seam 49, 51. The EB weld bead (i.e. seam 49, 51) extends past intersections 53 formed between replacement piece 44, 46 and airfoil 10 respectively.

Welding operations typically leave residual tensile fields within the welding joint (i.e. seams 49, 51), creating a region of inferior strength at precisely the location where strong bonds need to be developed to preserve the structural integrity of the joined airfoil. Another source of weakness may arise when the replacement piece is formed of a material whose properties do not correspond to those of the parent material. For these reasons and others relating to the need to perform some type of processing activity upon the joined airfoil to improve its strength and structural integrity, the repair method of the present invention incorporates a laser shock peening that effectively performs a type of cold-work hardening process.

The joined airfoil is shaped to return the joined airfoil to within predetermined dimensional tolerances (step 29) (FIG. 2). In one embodiment, the predetermined dimensional tolerance is substantially the same as a non-damaged airfoil. The process of shaping the joined airfoil comprises contour-milling the joined airfoil to a slightly oversized finished airfoil contour envelope. A subsequent hand-contouring grinding achieves a finished dimension of the joined airfoil. The step of shaping the joined airfoil comprise both removing the excess width of the replacement piece which extends from leading edge 55 of airfoil 10 and from the pressure surface 57 of airfoil 10.

Figure 7:
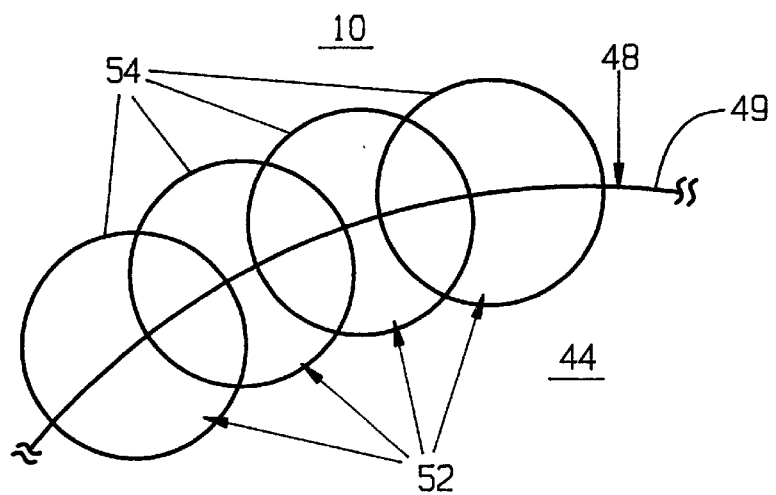
FIG. 7 is a detailed fragmentary sectional plan view of the joined assembly shown in FIG. 6 to illustrate the laser shock peening process relative to one representative area of the joined region (e.g. the seam), in accordance with yet another aspect of the repair method of the present invention.

Referring now to FIG. 7, there is provided a detailed fragmentary sectional view of one representative area of the illustrated weld joint 48 and seam 49 in FIG. 6 to illustrate the laser shock peening associated with the laser shock peening step (step 30, FIG. 2), in accordance with yet another aspect of the present invention. The joined airfoil comprising airfoil 10 integrally welded to replacement pieces 44 and 46 is subject to a processing treatment in which at least a portion of the joined airfoil is laser shock peened to produce a laser shock peening effect in at least a portion of seam 49. The laser shock peening operation could be employed to process any heat-affected zones produced by the welding activity. As known to those skilled in the art, welding operations typically transmit thermal energy into regions of the parent material and added material (i.e., airfoil 10 and replacement pieces 44 and 46) surrounding the welding joint or seam. This thermal influence establishes itself in the form of heat-affected zones located adjacent with and surrounding the welding joint. These heat-affected zones represent another source of weakness that likewise must be processed via laser shock peening. Accordingly, the objective of such laser shock peening operations is to generate within the seam and surrounding region and any heat-affected zones a matrix of compressive residual stresses induced by the laser shock peening activity.

Referring still to FIG. 7, there is illustratively depicted a representative arrangement of laser shock peened (LSP)

surfaces shown collectively at 52 formed by a representative series of overlapping laser shock peened (LSP) circular spots shown collectively at 54 generated in the manner discussed hereinabove. It should be clear that a laser shock peening operation that fully processes welding joint 48, having seam 49 will have a similar arrangement of LSP surfaces 52 formed along the entirety of the welding region. This diagrammatic presentation of the laser shock peening process should not be considered in limitation of the present invention as it should be apparent to those skilled in the art that the laser shock peening operation may be implemented according to various other formulations.

A single track (i.e. single pass) of overlapping circular spots are processed along seam 49. In alternate embodiments, the intensity of a pulse of coherent energy is varied depending on the processing location along the seam 49. In one embodiment, the intensity of a pulse of coherent energy used in processing is higher around intersections 53 as compared with the other portion of seam 49 (FIG. 6). Intersection 53 are formed by replacement pieces 44 and 46 extending chordwise past the leading edge 55 of airfoil 10. In an alternate embodiment, the intersection and regions around the intersection portions of seam 49 are processed at least twice. In such an alternate embodiment, an increase in the intensity of compressive residual stress is imparted into airfoil 10, and in particular, in and around seam 49 is increased due to either using a higher intensity pulse of coherent energy or repeat processing of the same spot along seam 49. The laser shock process could also include additional tracks along airfoil 10 or replacement pieces 44 and 46 adjacent seams 49, 51.

As shown, the illustrated LSP circular spots 54 are selected such that the illustrated LSP surfaces 52 resulting therefrom cover the illustrated welding joint 48 formed between airfoil 10 and replacement piece 44. Other shaped spots could also be employed which include but are not limited to elliptical, square, triangular and other polygonal shapes. The entire laser shock peening operation, and in particular the selection of target sites for developing LSP surfaces 52 on welding joint 48 in addition to developing such LSP surfaces on the surfaces of airfoil 10 and replacement piece 44 as needed, is tailored toward developing the aforementioned compressive residual stresses in the seam 49 and surrounding region and any heat-affected zones.

For the purposes of treating such heat-affected zones, it may be necessary to have an arrangement of LSP surfaces 52 disposed chordwise away from welding joint 48 that would, for example, be shifted outward relative to the indicated LSP surfaces 52 that currently overlie welding joint 48. Additionally, the laser shock peening operation must be further managed and controlled in order to ensure that the induced shock waves penetrate sufficiently into machine part 10 and replacement piece 44 so that the residual compressive stresses extend throughout, or in the desired manner into, the seam region. More particularly, the stress penetration coverage area associated with the extent of such residual compressive stresses can be adequately controlled by conventional means to obtain the full measure of laser shock peening processing activity vis-a-vis both the joining region and heat-affected zones.

Figure 8:
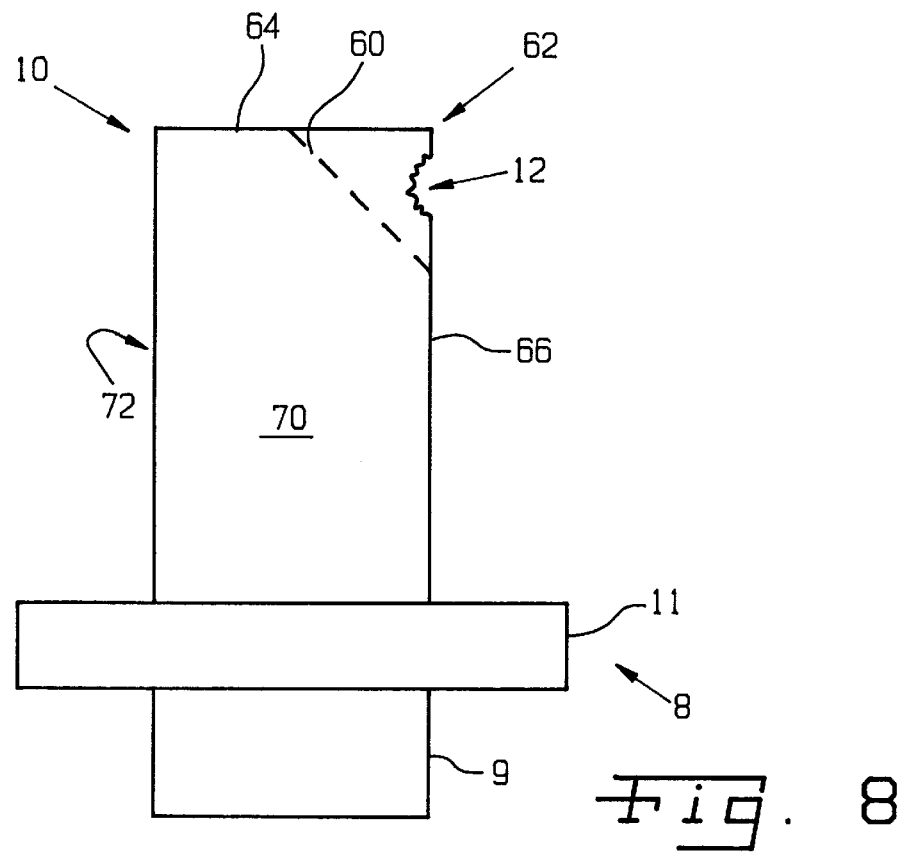
FIG. 8 is a front sectional plan view similar to FIG. 1 including illustrative cut-away line shown in phantom outline view to indicate the form and manner of removing the damaged area from the gas turbine engine component in accordance with one aspect of the repair method of the present invention.

Referring now to FIG. 8, airfoil 10 contains leading edge damage 12. Predetermined low stress line is indicated by dashed line 60. The removed section 62 is milled away. In a preferred embodiment the removed section 62 is milled away from the tip 64 to the leading edge 66.

Figure 9:
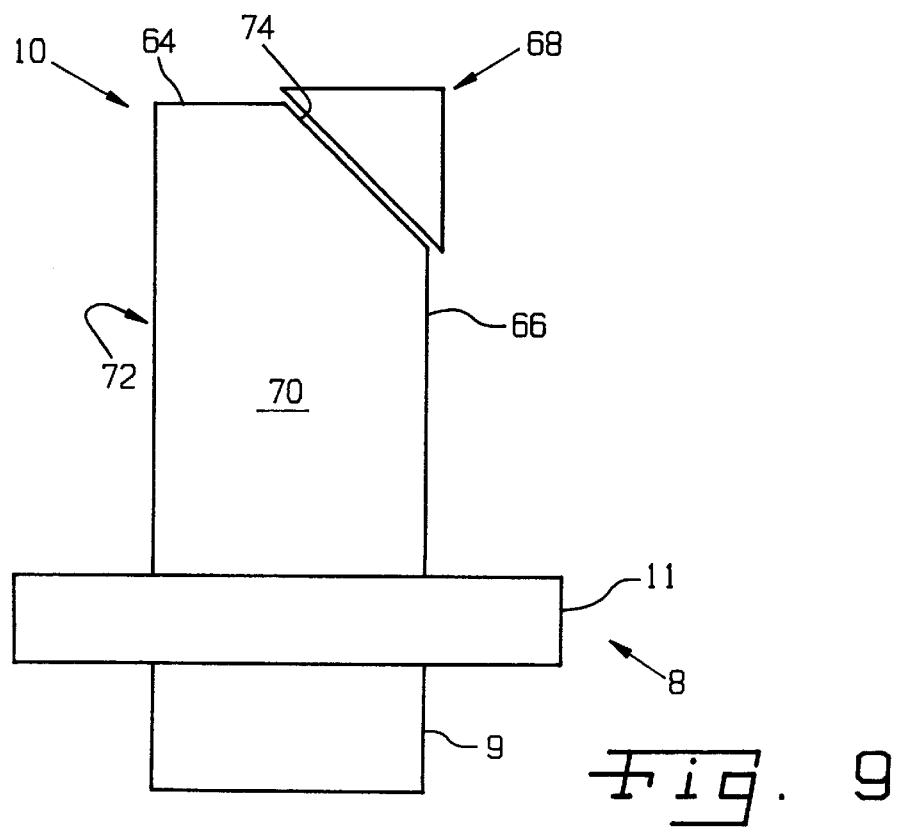
FIG. 9 is a sectional plan view of the engine component shown in FIG. 8 illustrating in exploded view, a replacement piece and the engine component.

Referring now to FIG. 9, replacement piece 68 is selected to be larger than the void formed as a consequence of the removal of section 62. Replacement section 68 is thicker than airfoil 10. Consequently, replacement section 68 extends from the pressure surface 70 and suction surface 72. In addition, replacement section 68 extends radially beyond tip 64 and chordwise beyond leading edge 66. Cut-away surface 74 is formed along airfoil 10 as a result of the removal (step 24 FIG. 2). Cut-away surface 74 is used for receiving replacement piece 68.

Figure 10A:
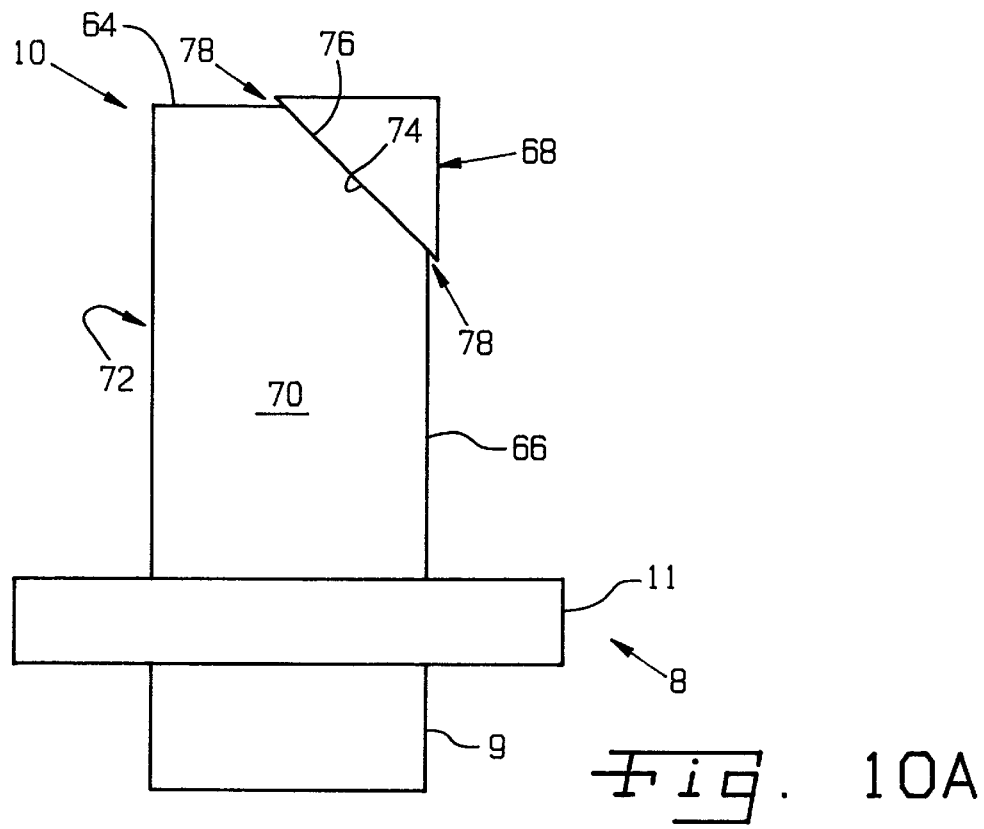
FIG. 10a is a sectional plan view of the engine component shown in FIG. 9 illustrating the replacement piece joined to the engine component of FIG. 9.

Referring now to FIG. 10a, replacement piece 68 is welded to airfoil 10 at cut-away surface 74. A weld joint having seam 76 is formed between airfoil 10 and replacement piece 68. The weld joint extends along the union of replacement piece 68 and cut-away surface 74. The weld further extends along replacement piece 68 past the intersection 78 formed between airfoil 10 and replacement piece 68. Intersection 78 forms a weld edge as the junction between airfoil 10 and replacement piece 68. The preferred welding procedure is as described above for the repair depicted in FIGS. 3–6.

Figure 10B:
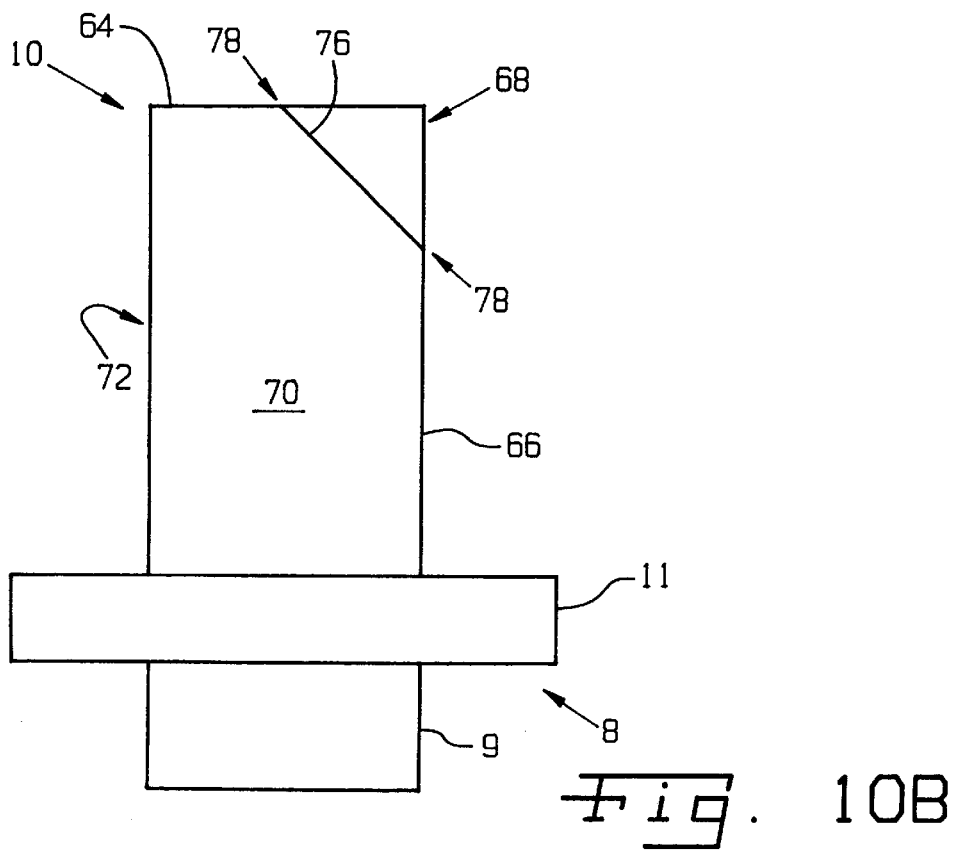
FIG. 10b is a sectional plan view of the engine component shown in FIG. 10a depicting the replacement piece attached to the engine component after shaping the engine component.

Referring now to FIG. 10b, the joined airfoil of airfoil 10 and replacement piece 68 is shaped by removing the excess material from replacement piece 68. The shaping step (step 29, FIG. 2) entails having airfoil 10 fixtured in rigid machine tooling and contour milling the joint airfoil to a slightly oversized finished airfoil contour envelope. A final operation of hand-contour blend grinding (step 30, FIG. 2), is used to achieve a finished dimension as necessary to put the joined airfoil within predetermined tolerances.

Laser shock peening is done along seam 76. Each spot along seam 76 is processed, at least once using a single track or pass of overlapping laser shock peening spots. The laser shock peening spots can be of any shape, to include but not limited to elliptical, circular, square, triangular or any other shape as appropriate to impart compressive residual stresses within seam 76 and the surrounding airfoil 10 and replacement piece 68. In one embodiment, the area along seam 76 near intersection 78 is additionally laser shock processed. These regions may be processed additional times by laser shock peening to achieve the desired compressive residual stress level and distribution below the surface. Intersections 78 correspond to the junctions of the tip 64 and leading edge 66 of airfoil 10 with the tip and lead edge of replacement piece 68 respectively.

In an alternate embodiment, the intensity of the laser beam pulse used in laser shock processing is varied depending on the location of seam 76 which is processed. In one embodiment, the areas on seam 76 closer to the intersection 78 (i.e. the weld edge near tip 64 or leading edge 66) is laser shock processed with a laser beam having a higher intensity than the laser pulse used within the more inner regions along seam 76 from the tip 64 or leading edge 66. For example, the cumulative intensity of the laser beam on spots near the intersection 78 may be 17 GW/cm$^2$, while the cumulative intensity of the laser beam on spots away from the intersection 78 is 7.5 GW/cm$^2$.

Figure 11:
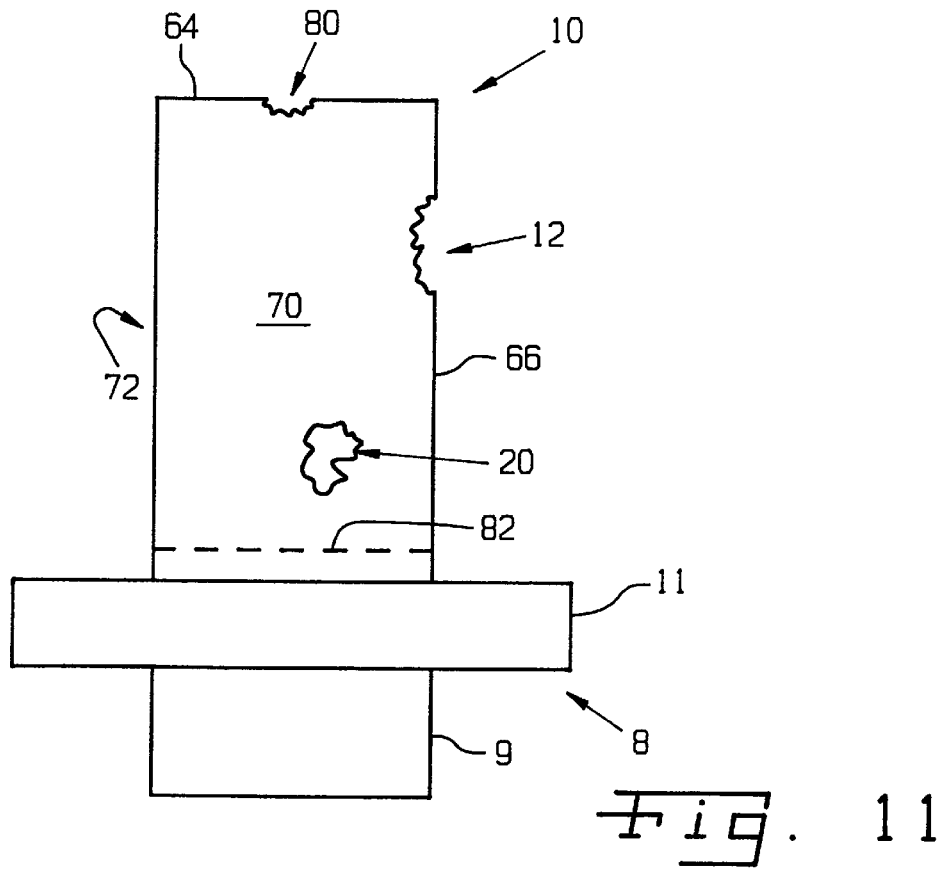
FIG. 11 is a front sectional plan view of the blade similar to FIG. 1, including phantom cut-away line to indicate the form and manner of removing the damaged area from the gas turbine engine component in accordance with one aspect of the repair method of the present invention.

Referring now to FIG. 11, airfoil 10 has leading edge damage 12, surface damage 20 and tip damage 80. The weld repair procedure depicted in FIG. 11 is to replace substantially the entire portion of airfoil 10 from above a predetermined low stress location as indicated by dash line 82. The portion of airfoil 10 above dash line 82 is milled away or cut off leaving a void where the section of airfoil 10 was removed and a stub 84 having cut-away surface 86 for receiving a replacement piece, as depicted in FIG. 12.

Figure 12:
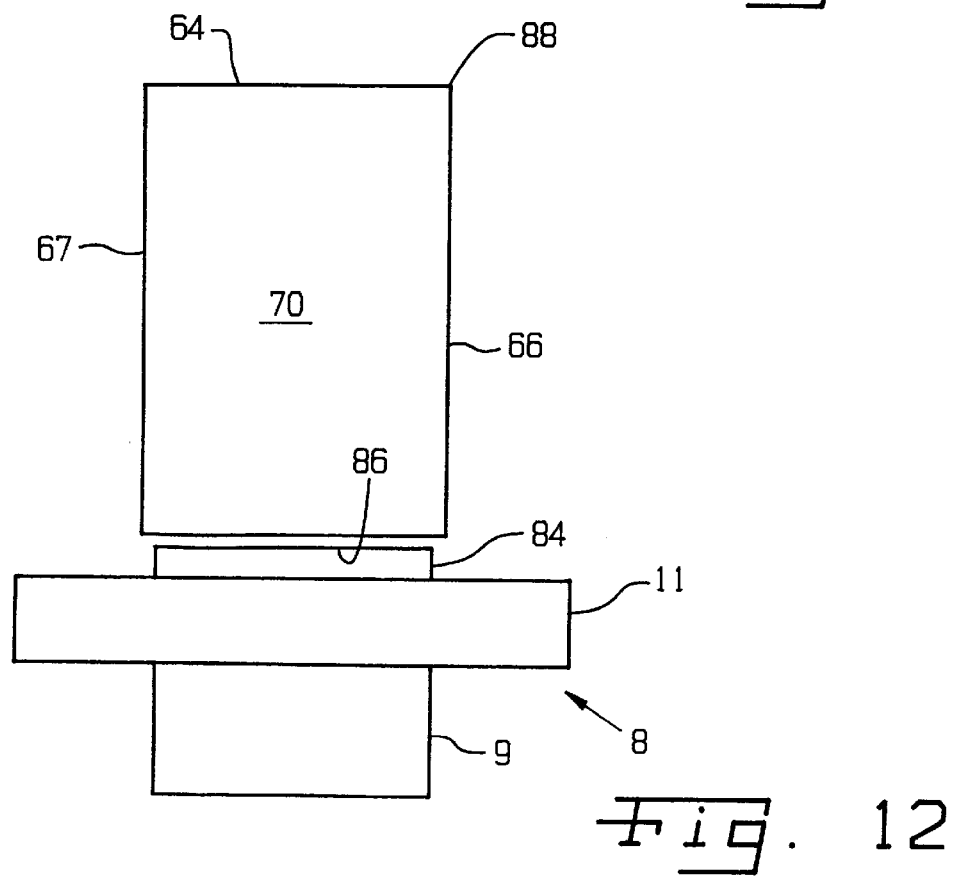
FIG. 12 is a sectional plan view of the gas turbine engine component shown in FIG. 11 illustrating, in exposed view, a replacement piece and the engine component of FIG. 11.
Figure 13A:
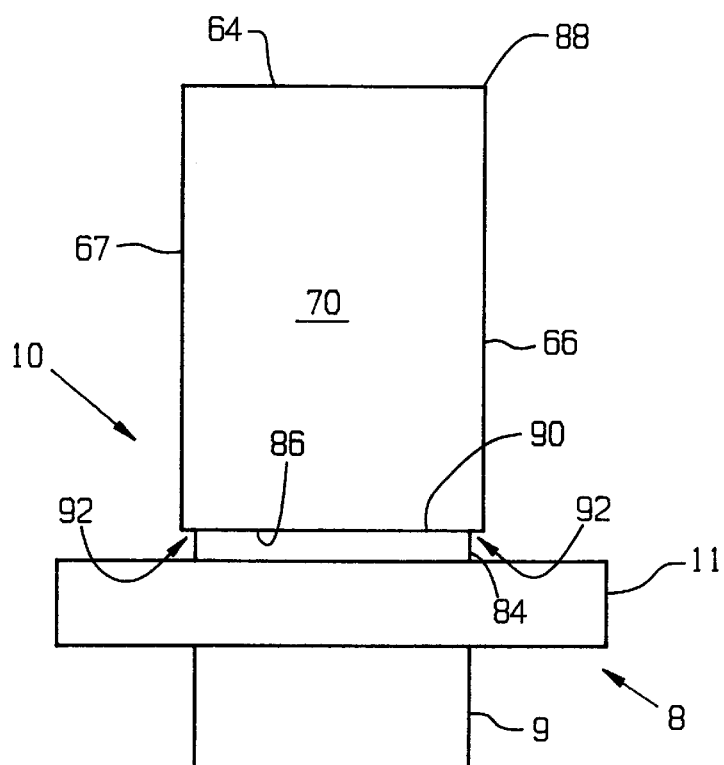
FIG. 13a is a sectional plan view of the engine component with replacement piece joined to the engine component of FIG. 12.
Figure 13B:
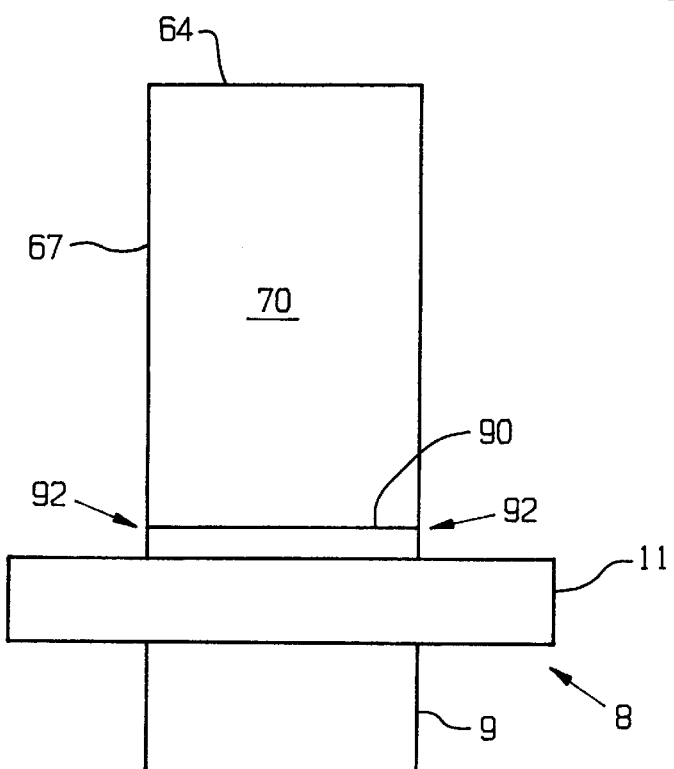
FIG. 13b is a sectional plan view of the joined engine component and replacement piece following shaping the joined engine component to be within predetermined dimensional tolerances.

Now referring to FIG. 12, replacement piece 88, in the preferred embodiment, is slightly larger in geometry whereby replacement piece 88 is slightly thicker, wider and taller than the removed section. Replacement piece 88 is welded to cut-away surface 84 using electron beam welding technique (described earlier) as depicted in FIG. 13a. A weld joint having seam 90 forms the joinder of replacement piece 88 to stub 84. The weld bead extends along the juncture of cut-away surface 86, stub 84, and replacement piece 88 past the intersections 92 of stub 84 with replacement piece 88. Airfoil 10 with joined replacement piece 88 forms a joined airfoil which is shaped to be within predetermined dimensional tolerances as previously described and depicted in FIG. 13b. Seam 90 is laser shock processed with at least a single track of overlapping laser processing spots spanning between leading edge 66 and trailing edge 67. In one embodiment, additional laser shock processing is done along seam 90 in the area near leading edge 66 and trailing edge 67. These areas correspond to the area on seam 90 near the leading edge 92 and trailing edge 67. In an alternate embodiment the intensity of the laser pulse is higher in the regions near the leading and trailing edge 66, 67 as compared with the intensity within the inner regions along seam 90.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of repairing an airfoil having a damaged area, the method comprising the steps of:
   removing a section of the airfoil containing the damaged area, leaving a void and a cut-away surface in the airfoil;
   providing a replacement piece for use in replacing the section removed from the airfoil;
   joining the replacement piece to the airfoil at the cut-away surface forming a joined airfoil, the joined airfoil having a seam between the airfoil and the replacement piece;
   shaping the joined airfoil to return the joined airfoil to within predetermined dimensional tolerances; and
   laser shock peening at least a portion of the seam of the joined airfoil, imparting compressive residual stresses therein.

2. The method as recited in claim 1, wherein said replacement piece substantially spatially matches the void in the airfoil.

3. The method as recited in claim 1, wherein said joining step further comprises the steps of:
   welding the replacement piece to the cut-away surface of the airfoil.

4. The method as recited in claim 3, wherein said laser shock peening step further comprises the steps of:
   laser shock peening at least a portion of the joined airfoil to produce compressive residual stresses in any heat-affected zones produced by said welding step.

5. The method as recited in claim 1, wherein the replacement piece being characterized by a geometry belonging to the group comprising a curvilinear shape, a rectilinear shape, a hemispherical shape, a circular shape, a wedge-type shape, a rectangular shape, and a cubical shape.

6. The method as recited in claim 1, wherein the damaged area includes damage belonging to the group comprising a cavity, a depression, a void, a crack, a fissure, an edge deformation, a thermal-induced deformation, a pressure-induced deformation, a vibration-induced deformation, and an impact-induced deformation arising from a foreign object.

7. The method as recited in claim 1, wherein the airfoil is a component of a gas turbine engine blade.

8. The method as recited in claim 1, wherein the replacement piece is dimensioned larger than the section removed.

9. The method as recited in claim 8, wherein said joining step further comprises welding the replacement piece to the cut-away surface of the airfoil to form a weld region.

10. The method as recited in claim 9, wherein said step of laser shock peening comprises laser peening at more than one cumulative power density along the weld region.

11. The method as recited in claim 9, further comprising:
   said welding forms a weld edge at an intersection of the replacement piece and the cut-out surface where the replacement piece extends one of radially and chordwise past the airfoil.

12. The method of claim 11 wherein said laser shock peening step comprises using a higher cumulative power density about the weld edge.

13. The method as recited in claim 11, wherein a higher level of compressive residual stress is imparted in the weld region near the weld edge.

14. The method as recited in claim 1, wherein the removal of a section of the airfoil step comprises removing substantially all of the airfoil above the base, leaving a stub portion having the cut-away surface.

15. The method as recited in claim 9, wherein the laser shock peening step comprises processing each spot at least once along the weld region and processing a second time near a weld edge formed at the intersection of the replacement piece and the cut-out surface where the replacement piece extends radially or chordwise past the airfoil.

16. A method of processing a workpiece having an area targeted for repair, said method comprising the steps of:
   removing a section of the workpiece substantially containing the targeted repair area, wherein the removal of the workpiece section leaves a residual void and a cut-away surface in the workpiece;
   providing a replacement piece for use in replacing the section removed from the workpiece, the replacement piece dimensioned larger than the portion removed;
   welding the replacement piece to the workpiece at the cut-away surface to define a joined assembly, the joined assembly having a seam between the workpiece and the replacement piece, said welding extending along the replacement piece past the cut-away surface;
   shaping the joined assembly to return the joined assembly to within predetermined dimensional tolerances; and
   laser shock peening at least a portion of the seam to impart compressive residual stresses therein.

17. The method as recited in claim 16, wherein the replacement piece being characterized by a geometry belonging to the group comprising a curvilinear shape, a rectilinear shape, a hemispherical shape, a circular shape, a wedge-type shape, a rectangular shape, and a cubical shape.

18. The method as recited in claim 16, wherein the workpiece comprises an integrated blade and rotor (IBR) component including a plurality of blade members integrally formed to a rotor member.

19. The method as recited in claim 15, wherein the workpiece comprises a blade.

20. The method as recited in claim 16, wherein the workpiece comprises a gas turbine engine component.

21. The method as recited in claim 16, wherein the area targeted for repair includes a damaged section.

22. The method as recited in claim 9, wherein said welding step comprises welding along the replacement piece past the cut-away surface of the airfoil.

23. The method as recited in claim 1, wherein the step of removing a section of the airfoil comprises removing the section along a predetermined low stress location extending between the leading edge and the tip.

24. The method as recited in claim 1, wherein the predetermined dimensional tolerances are substantially that of a non-damaged airfoil.

25. The method as recited in claim 1, wherein the shaping step comprises contour milling the joined airfoil.

26. The method as recited in claim 25, wherein the contour milling step comprises milling away the section of the airfoil starting from one of the airfoil tip and the leading edge.

27. The method as recited in claim 26, wherein the void formed from the removal step is substantially triangular shaped.

28. The method as recited in claim 16, wherein said step of laser shock peening comprises peening at more than one cumulative power density along the weld region.

29. The method as recited in claim 28, further comprising:
said welding step forms a weld edge at an intersection of the replacement piece and the cut-out surface where the replacement piece extends radially and chordwise past the workpiece.

30. The method of claim 29 wherein said laser shock peening step comprises using a higher cumulative power density about the weld edge.

31. The method as recited in claim 16, wherein said laser shock peening step imparts a higher level of compressive residual stress in the joined assembly near the weld edge.

32. The method as recited in claim 16, wherein said laser shock peening step comprises processing each spot at least once along the weld region and processing a second time near a weld edge formed at the intersection of the replacement piece and the cut-out surface where the replacement piece extends radially or chordwise past the airfoil.

33. A gas turbine engine component comprising a repaired airfoil produced according to the steps of claim 1.

34. A gas turbine engine component comprising a repaired airfoil produced according to the steps of claim 15.

35. A gas turbine engine component comprising:
an airfoil having a cut-away surface formed from the removal of a damaged section of said airfoil;
a replacement piece; said replacement piece welded to said cut-away surface defining a seam therebetween, said airfoil with said replacement piece forming a joined airfoil;
a laser shock peened surface on at least a portion of said seam; and
a region having compressive residual stresses extending into said seam from said laser shock peened surface.

36. The gas turbine engine component of claim 35 wherein the cut-away surface is formed by milling away said damaged section of said airfoil.

37. The gas turbine engine component of claim 35 wherein said replacement piece is substantially triangular.

38. The gas turbine engine component of claim 35 wherein said joined airfoil is shaped to be within predetermined dimensional tolerances.

39. The gas turbine engine component of claim 35 wherein said predetermined dimensional tolerances is substantially that of an undamaged airfoil.

* * * * *